US011963539B2

(12) United States Patent
Beth Halachmi et al.

(10) Patent No.: US 11,963,539 B2
(45) Date of Patent: Apr. 23, 2024

(54) PORT UNIT FOR A FOOD PROCESSING APPLIANCE

(71) Applicant: SOLO GELATO LTD., Hila (IL)

(72) Inventors: Barak Beth Halachmi, Hila (IL); Eynav Kliger, Moshav Betzet (IL); Nir Weintroub, Aviezer (IL); Jacob Rand, Herzliya (IL)

(73) Assignee: SOLO GELATO LTD., Hila (IL)

( * ) Notice: Subject to any disclaimer, the term of this patent is extended or adjusted under 35 U.S.C. 154(b) by 612 days.

(21) Appl. No.: 17/275,514

(22) PCT Filed: Sep. 12, 2019

(86) PCT No.: PCT/IL2019/051020
§ 371 (c)(1),
(2) Date: Mar. 11, 2021

(87) PCT Pub. No.: WO2020/053859
PCT Pub. Date: Mar. 19, 2020

(65) Prior Publication Data
US 2022/0110339 A1    Apr. 14, 2022

(30) Foreign Application Priority Data
Sep. 13, 2018   (IL) .......................................... 261761

(51) Int. Cl.
A23G 9/28    (2006.01)
A23G 9/04    (2006.01)
A23G 9/16    (2006.01)

(52) U.S. Cl.
CPC .............. *A23G 9/281* (2013.01); *A23G 9/16* (2013.01); *A23G 9/045* (2013.01)

(58) Field of Classification Search
CPC .......... A23G 9/281; A23G 9/16; A23G 9/045; A23G 9/22; A23G 9/28; A23G 9/04; A47J 31/00
See application file for complete search history.

(56) References Cited

U.S. PATENT DOCUMENTS

| 2,745,261 | A | * | 5/1956 | Merrill ...................... A23G 9/16 366/144 |
| 3,661,303 | A | | 5/1972 | Prosenbauer |
| 3,829,242 | A | * | 8/1974 | Duke ..................... F04B 53/109 62/70 |
| 5,620,115 | A | | 4/1997 | McGill |
| 2002/0043071 | A1 | | 4/2002 | Frank et al. |

(Continued)

FOREIGN PATENT DOCUMENTS

| CN | 1897820 A | * | 1/2007 | ............. A23G 1/208 |
| EP | 1 369 042 A2 | | 12/2003 | |
| EP | 2484225 A1 | * | 8/2012 | ............... A23G 9/24 |

(Continued)

*Primary Examiner* — Kun Kai Ma
(74) *Attorney, Agent, or Firm* — Vorys, Sater, Seymour and Pease LLP; Anthony P. Venturino; Maryellen Feehery Hank

(57) ABSTRACT

Provided is a port for a food processing appliance, in particular an appliance for the processing of ingredients and preparing a cooled edible product therefrom, e.g. ice cream, sorbet, gelato, frozen yogurt, soft-serve ice cream, slushes, shakes, blended frozen coffee drinks, etc., particularly such an appliance intended for home use, offices, or for small businesses.

6 Claims, 3 Drawing Sheets

(56) References Cited

U.S. PATENT DOCUMENTS

2003/0012864 A1 1/2003 Gerber
2016/0324185 A1 11/2016 Elsom et al.

FOREIGN PATENT DOCUMENTS

| EP | 2 480 095 B1 | 8/2013 |
| WO | 2013/121421 A1 | 8/2013 |
| WO | 2015/022678 A1 | 2/2015 |
| WO | 2018/008028 A1 | 1/2018 |
| WO | 2018/109765 A1 | 6/2018 |

* cited by examiner

PORT UNIT FOR A FOOD PROCESSING APPLIANCE

TECHNOLOGICAL FIELD

The present disclosure concerns a port for a food processing appliance, in particular an appliance for the processing of ingredients and preparing a cooled edible product therefrom, e.g. ice cream, sorbet, gelato, frozen yogurt, soft-serve ice cream, slushes, shakes, blended frozen coffee drinks, etc., particularly such an appliance intended for home use, offices, or for small businesses.

BACKGROUND

References considered to be relevant as background to the presently disclosed subject matter are listed below:
[1] PCT patent application publication number WO 2013/121421
[2] PCT patent application publication number WO 2015/022678
[3] PCT patent application publication number WO 2018/109765
[4] PCT patent application publication number WO 2018/008028

Acknowledgement of the above references herein is not to be inferred as meaning that these are in any way relevant to the patentability of the presently disclosed subject matter.

GENERAL DESCRIPTION

The present disclosure concerns an appliance for preparing a finished, typically cooled, edible product from ingredients. The finished edible product is of the kind that can be manipulated to flow out through an opening of the appliance and then out of a dispensing outlet. For this, the product may have the consistency of cream, gel, a semi-frozen product, ice cream, sorbet, gelato, frozen yogurt, soft-serve ice cream, slushes, shakes, blended frozen coffee drinks, etc.

The ingredients are introduced into a processing chamber of the appliance and, after processing, the finished product can be dispensed from the appliance through a dispensing outlet for consumption. Thus, the appliance according to this disclosure, comprises a dispensing outlet; an exemplary embodiment of such an appliance is one used for the preparation of a cooled edible product, such as ice cream, gelato, frozen yogurt, soft-serve ice cream, slushes, shakes, blended frozen coffee drinks, etc.

For preparation of the cooled edible product, the ingredients are introduced into a processing chamber of the appliance, processed there for a desired time until the finished product is ready for dispensing; then the finished product is allowed to egress from the chamber out of the dispensing outlet, e.g. by rotation of a dasher that is disposed in the processing chamber. In some embodiments, the dispensing outlet has the form of a shoot (to be referred to herein as "dispensing shoot").

It is a unique feature of this disclosure that the processing chamber is provided with a port (to be referred to herein as "port unit") that is typically fitted on an opening of the processing chamber, and switchable between at least two operational states: one of which is a loading state in which flow communication is established between a source of the ingredients and an opening of the chamber, to thereby permit introduction of the ingredients into the chamber; and a dispensing state in which the port unit permits the establishment of flow communication between the chamber's opening and the dispensing outlet, to thereby permit dispensing the finished product.

The port unit may comprise a displaceable plunger for switching the port unit between the two states. The plunger may be accommodated within a housing and displaceable between a first position (corresponding to the dispensing state), in which the plunger clears the chamber opening and permits direct communication between the chamber's opening and the dispensing outlet; and a second position (corresponding to the loading state), in which liquid communication is established between an ingredients source and the chamber's opening.

By one embodiment, said link between the ingredients source and the chamber's opening is provided by a linking conduit, defined within the plunger, that links between a first conduit end configured for coupling with the ingredients source; and a second conduit end that is aligned with and opens into the chamber opening when the plunger is in its second position. When the plunger is in its first position, said second conduit end is blocked.

It is noted that the linking conduit may also function as a vent or a pressure-release conduit in case pressure is built in the chamber (e.g. due to introduction of ingredients thereto) when the plunger is at its second position. Thus, the linking conduit also functions as a pressure-releasing utility, when desired, eliminating the need for a separate pressure valve.

As a person of the art will appreciate, instead of utilizing the typical set-up of distinct inlets for ingredients, pressure release outlets and finished product outlets, the appliance of this disclosure that is fitted with the port unit minimizes the required inlets and outlets that come into contact with the ingredients or the finished product. In other words, the port unit functions as an ingredients' inlet, a finished product outlet and a pressure release valve, all constituted by the port unit, thereby limiting the surface area of the appliance that comes into contact with the ingredients and/or the finished product and minimizing the passages in which food stuff (ingredients and/or finished product) may accumulate, thus facilitating and simplifying cleaning.

The port unit is typically elongated about a longitudinal axis. The longitudinal axis may have a vertical orientation, such that a dispensing shoot is positioned at the bottom end of the unit.

The plunger may be accommodated within an axial bore defined in the housing, and the switching between the two states (or two positions) is through change in the axial position of the plunger within the axial bore.

By one embodiment, the plunger is manually operated through a user-accessible handle. The handle may be displaceable within a track, and may have first and second handle-resting locations for fixing the plunger in the respective first and second positions. As can be appreciated, by other embodiments, the plunger may be displaced by a motor which may be a pneumatic, hydraulic or electric motor.

For preparation of the cooled edible product, the processing chamber has a cooling and mixing chamber with cooled walls and typically a dasher or the like for mixing the ingredients.

The ingredients source may be in the form of a container being an integral or removable part of the appliance, an external container (fixed to or detachable from the appliance), or even in the form of a single-use capsule or pod that contains the ingredients, for example ingredients in an amount for preparing one serving of product.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 1A and 1B show an appliance in accordance with an embodiment of this disclosure, with a port unit fitted onto the processing chamber, wherein FIG. 1A shows the port unit in a loading state and FIG. 1B in a dispensing state.

DETAILED DESCRIPTION OF EMBODIMENTS

Figure 1A:
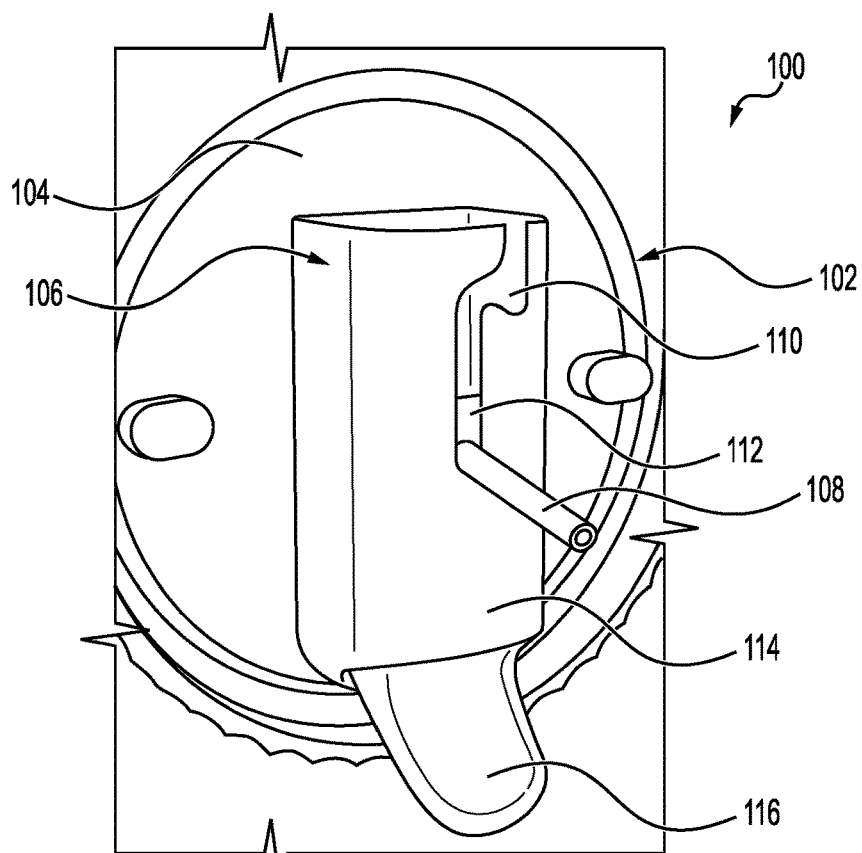
Figure 1B:
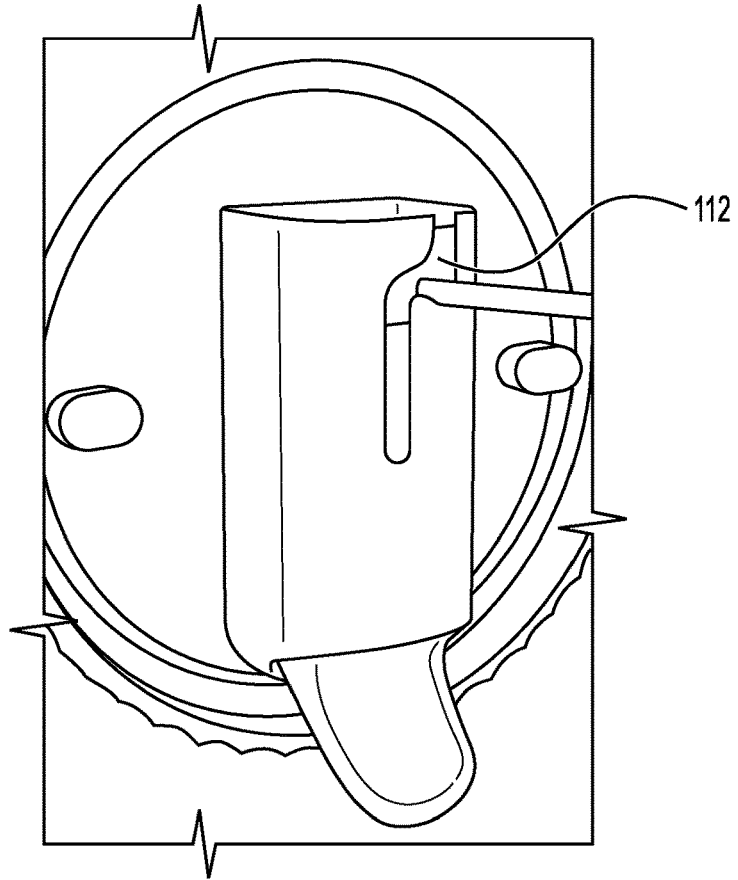

Reference is first being made to FIGS. 1A and 1B showing an appliance 100 for processing ingredients and preparing a finished product, which in a specific embodiment is a cooled edible product, such as ice cream. The appliance has a processing chamber 102, the front interface 104 of which is seen, and fitted on this front interface is a port unit 106. Port unit 106 has a user-accessible handle 108 accommodated within slot 110 and fixed to plunger 112; by manipulation of the handle, a user can switch the port unit between the loading state and the dispensing state, illustrated in FIGS. 1A and 1B, respectively.

Figures 2A, 2B:
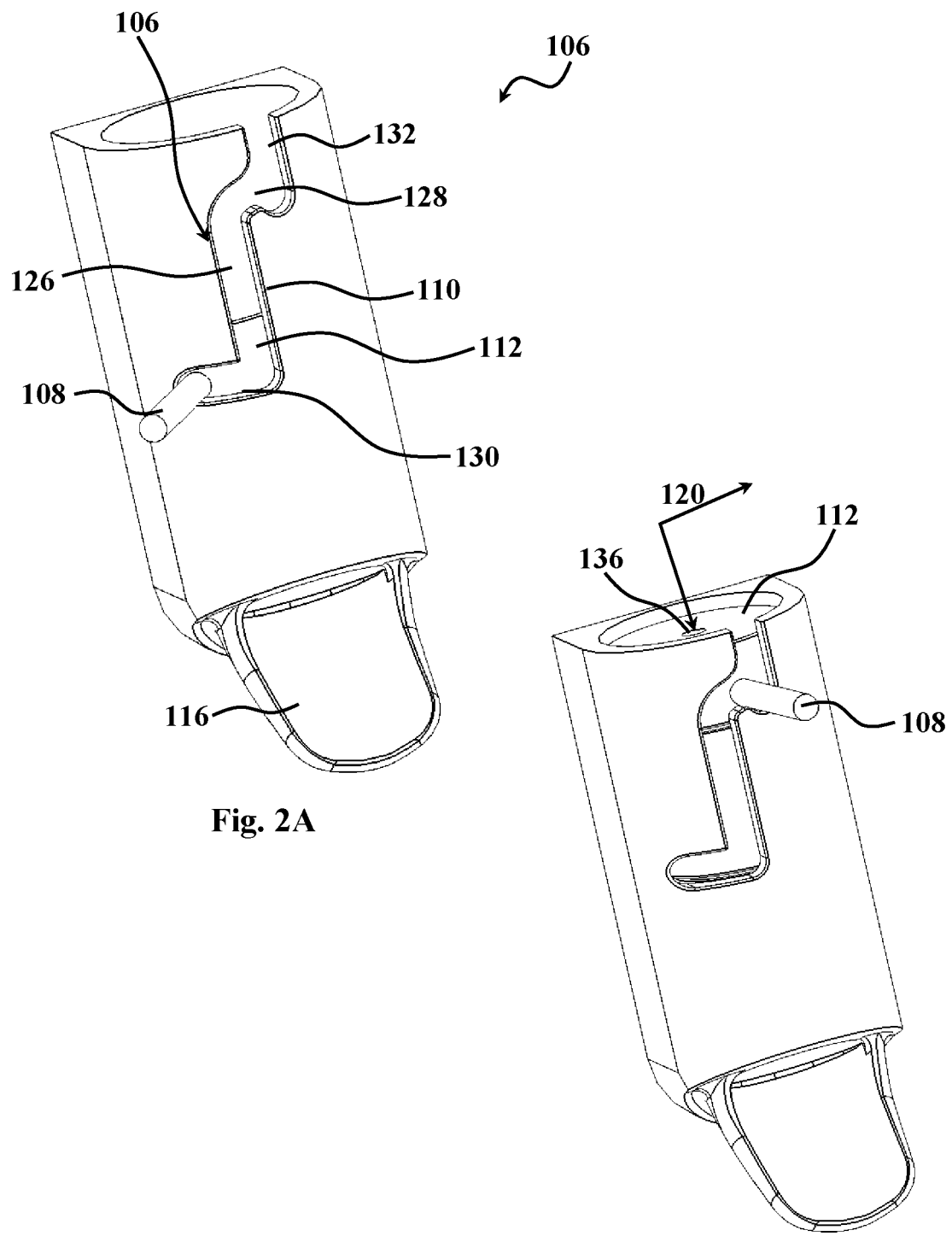
FIGS. 2A and 2B are schematic perspective illustrations of a port unit in isolation, in respective loading state and dispensing state.
Figure 3A:
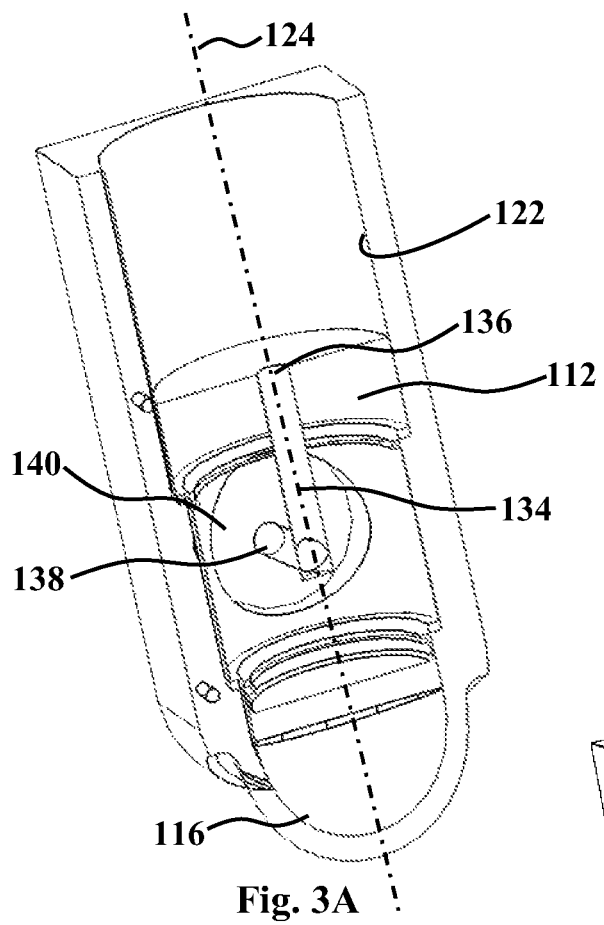
FIGS. 3A and 3B are perspective longitudinal cross-sections through a port unit of FIGS. 2A and 2B in respective loading state and dispensing state, with the plunger being transparent in order to show the conduit's communication with the opening of the chamber.
Figure 3B:
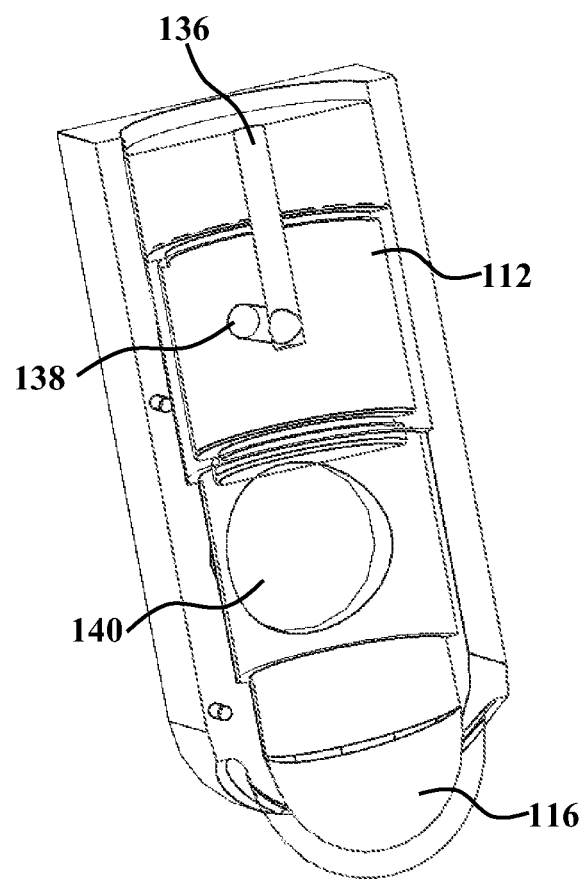

Port unit 106 has a dispensing shoot 116 at its bottom end for dispensing the finished product which, in this case, can be a cooled edible product, such as ice cream, sorbet, gelato, frozen yogurt, soft-serve ice cream, slushes, shakes, blended frozen coffee drinks, etc. As can be appreciated, the dispensing shoot 116 is but an example and there may be many different dispensing outlets, e.g. in accordance with the type of product to be dispensed. The port unit is linked, as demonstrated schematically by arrow 120 in FIGS. 2A and 2B, to a source of ingredients (not shown) for their introduction into the processing chamber, in the manner to be described below.

The operation of the port unit can best be explained with reference to FIGS. 2A-3B. As can be seen in these Figures, particularly FIGS. 3A-3B, a bore 122 is defined within elongated housing 114 and also defines a longitudinal (at this example a vertical) axis 124. The plunger 112 is accommodated within bore 122, and can reciprocate within the bore between the two operational positions corresponding to the loading state (seen in FIGS. 2A and 3A) and the dispensing state (see in FIGS. 2B and 3B) of the port unit.

Slot 110 has a generally serpentine shape and defines a track that guides the movement of handle 108. The slot 110 has a vertical portion 126, and upper and lower horizontal portions 128 and 130, respectively. The horizontal portions 128 and 130 define resting locations for fixing the handle 108 in its operational positions, corresponding to the dispensing and loading states, respectively. The slot also has a terminal vertical portion 132 that has no functional significance for the operation of the unit, but serves as a passage permitting insertion of the plunger into the unit during assembly or for removing the plunger from the unit during cleaning or maintenance.

Defined within the plunger 112 is a linking conduit 134 (better seen in FIGS. 3A-3B) that forms a link between a first conduit end 136 for coupling with an ingredients source (not shown), and a second conduit end 138 that, in the lower position (i.e. the second position) of the plunger, aligns with and opens into the chamber opening 140. Thus, once the plunger 112 is brought into the lower position, corresponding to the loading state of the unit, ingredients from the ingredients source are introduced into the chamber. After processing of the ingredients within the chamber, the plunger is elevated to its upper (first) position, corresponding to the dispensing state of the unit, whereupon opening 140 is in direct flow communication with dispensing shoot 116 and, accordingly, the finished food product is pushed out of the chamber (e.g. by rotation of a dasher disposed in the chamber) and can flow out through the opening 140 and onto the dispensing shoot 116, and hence dispensed.

As can be appreciated, there may be a wide variety of different embodiments of the port unit. By way of example, the bore within the housing may not be cylindrical as in the schematic illustrations of FIGS. 2A-3B and also there may be different mechanisms for displacing the plunger and arresting it in the different operational positions. Further, rather than manual manipulation in some embodiments, the plunger may be operated by a handle-free mechanism, such as by a motor which may be pneumatic, hydraulic or electric. As can also be appreciated, while in a specific exemplified embodiment the finished product is a cooled edible product, it may have different forms, there may also be different types of finished products, such as for example mixtures of a liquid or semi-liquid carrier, flavoring agents, taste-influencing ingredients, or ingredients that impart a desired texture, etc.

Further, as can also be appreciated, while in the exemplary appliance described herein the port unit is positioned at a front interface of the appliance, it is also possible that the port unit be positioned in other locations of the appliance. For example, the port unit may also be positioned on a bottom interface, such that feeding of ingredients and dispensing of the finished product are carried out via a bottom wall section of the chamber.

The invention claimed is:

1. An appliance for processing of ingredients and preparing a finished edible product therefrom, the appliance comprising a processing chamber, wherein
    a port unit is associated with the chamber and fitted onto a chamber opening,
    the port unit is switchable between at least two operational states that comprise a loading state in which the port unit establishes a flow communication between a source of the ingredients and the chamber's interior and a dispensing state in which the port unit establishes flow communication between the chamber's interior and a dispensing outlet for dispensing the finished product,
    the port unit comprises a housing, a dispensing shoot, and a displaceable plunger for switching between the two states, the housing accommodating the displaceable plunger that is displaceable between a first position in which the chamber opening is in communication with the dispensing shoot and a second position in which the displaceable plunger blocks the chamber opening, and
    defined within the displaceable plunger is a linking conduit linking between a first conduit end for coupling with the source of the ingredients and a second conduit end that in said second position is aligned with and opens into the chamber opening and is blocked in said first position.

2. The appliance of claim 1, wherein the dispensing shoot is fitted at the housing's bottom portion.

3. The appliance of claim 1, wherein the plunger is displaceable along a vertical axis.

4. The appliance of claim 1, wherein the plunger is manually operated by a user accessible handle.

5. The appliance of claim 4, wherein the user accessible handle is displaceable within a track with first and second handle resting locations for fixing the plunger in respective first and second positions.

6. The appliance of claim 1, wherein the processing chamber is a cooling and mixing chamber for preparing a cooled edible product from the ingredients.

\* \* \* \* \*